United States Patent
Tveit et al.

(10) Patent No.: US 8,126,752 B2
(45) Date of Patent: Feb. 28, 2012

(54) SYSTEM AND METHOD TO PROVIDE MAINTENANCE FOR AN ELECTRICAL POWER GENERATION, TRANSMISSION AND DISTRIBUTION SYSTEM

(75) Inventors: Tor Andreas Tveit, Oslo (NO); Roald Kleivi, Oslo (NO); Ragnar Moen, Oslo (NO); Ole-Morten Midtgård, Billingstad (NO); Lars S. Gundersen, Billingstad (NO); Arne Nysveen, Billingstad (NO)

(73) Assignee: ABB AS (NO)

( * ) Notice: Subject to any disclaimer, the term of this patent is extended or adjusted under 35 U.S.C. 154(b) by 359 days.

(21) Appl. No.: 11/653,668

(22) Filed: Jan. 12, 2007

(65) Prior Publication Data
US 2007/0203779 A1  Aug. 30, 2007

Related U.S. Application Data

(63) Continuation of application No. 09/751,970, filed on Dec. 29, 2000, now abandoned.

(51) Int. Cl.
 *G06Q 10/00* (2006.01)
 *G01R 11/56* (2006.01)
 *G01R 21/133* (2006.01)
 *G06F 17/00* (2006.01)

(52) U.S. Cl. ............................ 705/7.11; 705/412

(58) Field of Classification Search ............... 705/7.11, 705/412
See application file for complete search history.

(56) References Cited

U.S. PATENT DOCUMENTS

| | | | |
|---|---|---|---|
| 5,132,920 A | * | 7/1992 | Bellows et al. ............... 702/184 |
| 5,305,244 A | | 4/1994 | Newman et al. |
| 5,311,562 A | | 5/1994 | Palusamy et al. |

(Continued)

FOREIGN PATENT DOCUMENTS

EP  0 650 125  4/1995

(Continued)

OTHER PUBLICATIONS

IEEE Standard 625-1990; "IEEE Recommended Practice to Improve Electrical Maintenance and Safety in the Cement Industry", 1991, pp. 1-8.*

(Continued)

*Primary Examiner* — Peter Choi
(74) *Attorney, Agent, or Firm* — St. Onge Steward Johnston & Reens LLC (57) ABSTRACT

A method for providing maintenance to an electrical power generation, transmission and distribution system, and an information system and one or more computer program software means for carrying out same. A method to provide maintenance to an electrical power generation facility and/or an electrical power transmission and distribution network system operated by a Utility. Maintenance personnel visit a site to inspect a condition of said apparatus, and examine information from an Information System operated in co-ordination with a Help Desk. The method comprises further steps such as preparing a report of the apparatus with a mobile web camera, making a report comprising a graphic image of the condition of said apparatus, receiving at said Help Desk and Information System the report and graphic image from the inspector/repairman, finding stored information about said apparatus and/or said system in said Information System, comparing said stored information with the report and/or graphic image, the inspector/repairman making in consultation with the Help Desk an assessment of the condition of said apparatus and providing a recommendation such as a repair, a temporary repair or making a plan for a repair at a later time.

20 Claims, 3 Drawing Sheets

U.S. PATENT DOCUMENTS

| | | | |
|---|---|---|---|
| 5,321,629 A | 6/1994 | Shirata et al. | |
| 5,657,245 A * | 8/1997 | Hecht et al. | 700/287 |
| 5,817,958 A | 10/1998 | Uchida et al. | |
| 5,975,737 A | 11/1999 | Crater et al. | |
| 5,995,911 A | 11/1999 | Hart | |
| 6,018,449 A | 1/2000 | Nelson et al. | |
| 6,111,735 A | 8/2000 | Nelson et al. | |
| 6,236,949 B1 | 5/2001 | Hart | |
| 6,243,244 B1 | 6/2001 | Nelson et al. | |
| 6,347,027 B1 | 2/2002 | Nelson et al. | |
| 6,529,839 B1 | 3/2003 | Uggerud et al. | |
| 6,545,482 B1 | 4/2003 | Fedirchuk et al. | |
| 6,574,672 B1 * | 6/2003 | Mitchell et al. | 709/250 |
| 6,611,773 B2 | 8/2003 | Przydatek et al. | |
| 6,668,629 B1 | 12/2003 | Leslie | |
| 6,671,654 B1 | 12/2003 | Forth et al. | |
| 6,697,951 B1 | 2/2004 | Sinha et al. | |
| 6,785,592 B1 * | 8/2004 | Smith et al. | 700/291 |
| 6,959,235 B1 * | 10/2005 | Abdel-Malek et al. | 701/33 |

FOREIGN PATENT DOCUMENTS

EP         0 369 188         12/1995

OTHER PUBLICATIONS

American Institute of Real Estate Appraisers, The Appraisal of Real Estate, 1978, pp. 211-213 and Chapter 26.*
Doc Palmer, Maintenance Planning and Scheduling Handbook, 1999, Chapters 4 and 5, Appendices E and F.*
Hopp, WJ, Spearman, ML, and Zhang, RQ, "Easily Implementable Inventory Control Practices", Operations Research, 45:(3), May-Jun. 1997, pp. 327-328.*
Sturm, F. A. et al., "The Paperless Power Plant", http://www.newenergyassoc.com/documents/The_Paperless_Power_Plant.pdf, 2003.
IEEE Standard 625-1990; "IEEE Recommended Practice to Improve Electrical Maintenance and Safety in the Cement Industry"; © 1991, pp. i-8.
Microsoft Press, Computer User's Dictionary, p. 124, 1998.

* cited by examiner

SYSTEM AND METHOD TO PROVIDE MAINTENANCE FOR AN ELECTRICAL POWER GENERATION, TRANSMISSION AND DISTRIBUTION SYSTEM

This patent application is a continuation application of, and incorporates by reference the entire disclosure of, U.S. patent application Ser. No. 09/751,970, which was filed on Dec. 29, 2000, now abandoned.

TECHNICAL AREA

The present invention relates to providing maintenance for an electrical power transmission and distribution network, as well as for power generation installations. In particular the present invention is a device and a system, and a method to provide maintenance for all parts of an electrical power system. According to other aspects of the invention a database means, an inspection means, a Help Desk means, and a web site are also provided.

BACKGROUND ART

Electrical power generation, transmission and distribution relies on a number of transmission and distribution networks to transfer electrical power to a series of end users, as well as the generating equipment itself. Generating equipment includes the devices for generating the electrical power, most often an electrical machine such as for example a synchronous generator. Generating equipment also includes fuel cells, batteries such as used in an Uninterruptible Power Supply (UPS), solar cells etc. It also includes the devices necessary for actually bringing the power to the transmission or distribution networks, such as power transformers, instrument transformers, circuit breakers of various kinds, surge arresters etc., as well as secondary devices such as transducers, sensors and other devices needed for controlling the system. A transmission network can include high voltage lines or cables, both AC and DC, and a diversity of equipment meant to ensure the secure and reliable transmission of power, for example reactors, capacitors, Synchronous Condensers, Static Var Compensators, FACTS components, etc., and secondary devices as referred to above. Whereas transmission refers to the highest level in the hierarchy of systems that eventually deliver electrical power to end consumers, distribution networks are systems that are closer to end users, including both high voltage, medium voltage, and low voltage systems, medium voltage being defined as the lower levels of high voltage. A distribution network on high or medium voltage level will be similar to a transmission network. On the lowest levels of distribution, the voltage is typically transformed from medium voltage to low voltage, which is the level that ordinary consumers see. Such systems typically include medium voltage, low voltage and feeder sections with a diversity of switching equipment, substations, transformers, breakers, fuses, measuring and other electrical equipment situated in a diversity of locations, buildings and yards. This includes distribution equipment to more or less specialised equipment for industrial and commercial consumers, factories etc., as well as ordinary household consumers.

The background of this invention is in electrical power transmission and distribution networks, and in electrical power generation. The invention specifically also relates to generation and distribution functions of plants including smaller and less traditional generation means such as micro turbines, wind farms, Combined Heat and Power plants (CHP) and other often privately owned generators that supply power to the network in a distributed fashion.

Operations and operational service criteria may be classified not only by type of consumer, large or small for example. Factors of location such as rural, urban or city; criticality of supply, that is, supply for a hospital versus supply for a warehouse contribute to a diverse range of requirements for delivery of electrical power. The operation of such transmission and distribution networks demands a broad diversity of know how, organisation, maintenance, financing, development or expansion, spare parts, access to new equipment and technically skilled labour.

By tradition, and under conditions of a regulated market with state or community owned monopolies, a utility company is a company that operates and usually owns generating and/or transmission/distribution equipment. The utility company carries out a range of functions including maintenance of a network in accord with both present and future requirements. This is typically based on the utilities own business plan and carried out using primarily in-house engineering staff and other specialist professionals, supplemented as needed by outside sub-contractors and/or consultants to perform specific maintenance or more often installation tasks. As a result of a specific plan for maintenance for the network, maintenance work is carried out to ensure a planned level of service availability for the network and it's several power generation, distribution and power supply parts. In practice assets are owned and maintenance staff employed or allocated as or when needed to execute a maintenance plan designed to meet a present or forecast demand for electrical power.

However under de-regulation market conditions have led to a re-focusing of priorities as regards the requirement for maintenance of a transmission and distribution network to better meet present requirements and future requirements. First, maintenance is expected to be carried out under a more cost effective and predictable cost regime. Second, emphasis on meeting stringent power levels, power availability and power quality requirements set by regulatory authorities, together with a generally reduced investment in installed plant throughout the industry, demands maintenance that shall provide solutions that comply with both stringent technical and financial demands. One such approach is called RCM—Reliability Centred Maintenance.

Third, the increased focus on distributed, environmentally friendly generation, is leading to growing numbers of smaller and unconventional power plants such as micro turbines, Combined Heat and Power (CHP) plants, wind farms, tidal water or ocean wave plants, solar cell plants, and Fuel Cell plants, being connected to power grids. At the same time, components such as power lines and transformers are increasingly being operated closer to their physical, often thermal, limits. This makes the power system itself, and its operation and maintenance, more complex. For example, operating power lines closer to their thermal limits at the same time as new asynchronous wind parks are connected to the grid destabilises the power system, and increases the risk of error. Another example is that the connection of a large number of small, often single phase, generators makes it more difficult to carry out network control functions such as balancing loads in parts of the network, thereby also increasing the risk of error.

Fourthly under de-regulated market conditions the owner or operator of a power distribution network may not be a traditional utility company with experience of running and maintaining such networks. For such a new owner/operator the provision of maintenance in an effective and economic way without the benefit of access to internal know-how may be difficult.

Thus, utilities and operators are faced with the challenge of delivering high quality, reliable electric power at competitive rates to their customers using limited manpower and resources. This calls for devices, systems and methods that can provide maintenance of a power system in a cost-effective and reliable way.

A document available from enervista.com (Trade Mark) describes an approach to substation management for municipal utilities and rural co-operatives that includes the use of Internet-technology. A system is described with modules with names such as eSCADA and eEXPERT. With an eSCADA module, substations are equipped with a Universal Relay provided by General Electric (GE), and monitored via a Web-interface. When an error in the system occurs, an alarm and error message appears in a Web-browser included in eSCADA, and certain information on the fault is available. Associated with the fault information is the eEXPERT module, which is a knowledge base with public documents and internet links to websites of standards, application papers, notes and diagnosis guides, as well as proprietary procedures and documents. One advantage is stated to be a significant speed-up of outage restoration by less-experienced staff. It is also mentioned that if a fault or early warning is detected by a regional operator, an engineer could be contacted to access settings, events at time of trip etc to assist in recommending suitable corrective actions. It also is described that a repair crew, prior to heading out, can get exact details of what equipment has failed, where it is, and the nature of the problem. It is also mentioned that the crew can call up and print stored documents such as network configuration, wiring diagrams and maintenance procedures.

The advantage of the system described seems to be limited to that the Utility itself has a presumably cheaper software system for substation management, cheaper because of the utilisation of the ubiquitous Internet-technology instead of expensive proprietary SCADA software and custom programming. However in a context of providing cost-effective maintenance to ensure a reliable supply of high quality electrical power the description is limited in that it only addresses response to power outages of the sort caused by weather damage to equipment. For example, the description does not describe how less-experienced staff may be enabled to carry out repair or maintenance tasks.

SUMMARY OF THE INVENTION

It is an object of the invention to provide a system and method for a third party to provide maintenance service for an electrical power generation, transmission and distribution system to a Utility or other operator of a power system.

This and other objects are fulfilled by the present invention according to a method described in the first independent claim and a system described in the second independent claim. Advantageous embodiments are described in subclaims to the above independent claims. In addition, further and advantageous aspects of the invention are described as a computer program product and a computer data signal.

The principal advantage of the invention is that maintenance service for a transmission and distribution network and power plants may be carried out to assure quality and continuity of supply in a more effective and cost effective way. In addition, the invention reduces the need for the Utility to employ, train and maintain a large staff of own Maintenance and Engineering experts.

Further, these experts may instead be provided by a third party company according to aspects of the invention, which company may have several customers, making the utilization of such personnel much better, both in terms of building up and maintaining their competence, and in terms of utilizing their time more efficiently.

Another advantage of the invention is that updated component and system documentation is available 24/7 by means of an embodiment of the invention, to any Internet-enabled device operated by an registered user. Said documentation during use of the method and system according to an embodiment of the invention also comprises up to date reports on the maintenance status of the power network, reports of repairs carried out and/or reports of maintenance planned to rectify, amongst others, reported faults.

A further object is to provide, according to other aspects of the invention, a web site and computer software or computer program means for carrying out the methods of the invention.

BRIEF DESCRIPTION OF THE DRAWINGS

A more complete understanding of the system and apparatus of the present invention may be had by reference to the following detailed description when taken in conjunction with the accompanying drawings wherein.

DETAILED DESCRIPTION OF THE EMBODIMENTS

Figure 1:
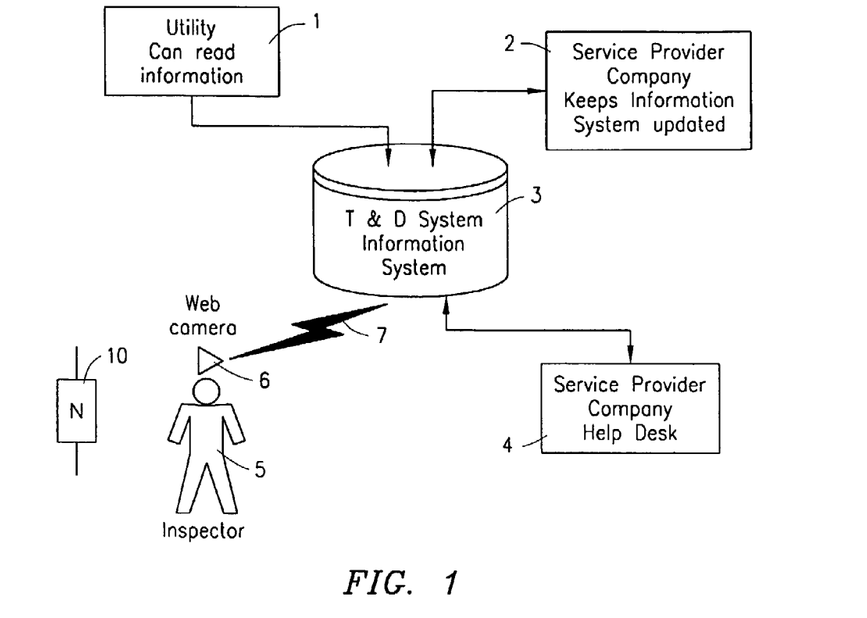
FIG. 1 shows a schematic diagram of an Information System for a power generation, distribution and transmission system according to an embodiment of the invention

FIG. 1 shows a Utility 1, a Service Provider company 2, a Power Transmission & Distribution (T&D) System Information System 3, a Help Desk 4 provided by the Service Provider company 2, an inspector 5 from the Utility, with an Online Inspection Kit 6. A component 10 with a fault is shown schematically.

Figure 2:
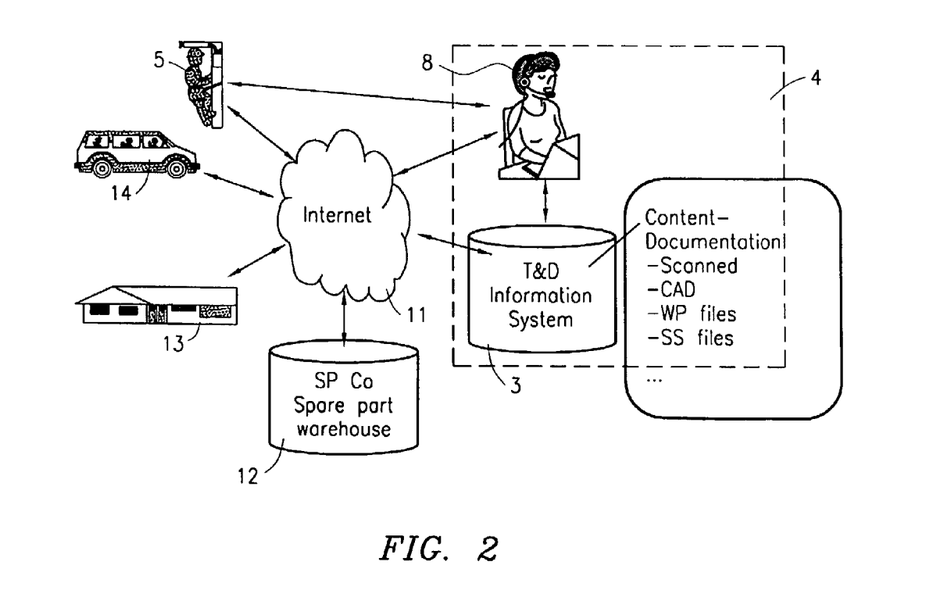
FIG. 2 shows a schematic diagram to provide maintenance services to a power generation, distribution and transmission system, according to an embodiment of the invention.

FIG. 2 shows the Power System Information System 3, and the Help Desk 4, the Inspector 5, a skilled Help Desk engineer 8, a Service Provider (SP) company spare parts warehouse 12, a vehicle 14 and a building 13. Connections between all of these people and/or functions to the Internet 11 are indicated by means of arrows, such as the double ended arrow signifying two-way communication between Inspector 5 and Help Desk engineer 8.

The Service Provider Company 2 operates and maintains the Power System Information System 3 and provides maintenance services for a Utility 1. The Utility may be a traditional utility company or any other operator or owner of a whole or part of an electrical power generation, transmission and distribution network. The Utility has access to all information about it's power network in the Information System via Web-technology, and may also have the possibility to update that information, depending on an agreement with the Service Provider Company. The system according to the invention includes:

The Help Desk 4 provided by the Service Provider Company, always available and manned by highly skilled technical expertise, such as a skilled Help Desk engineer 8.

An Online Inspection Kit (OIK) 6 provided to the utility by the Service Provider Company as part of a service agreement.

The OIK 6 preferably includes a web camera and an operator computer terminal, each effectively equipped with a communication link to the Power T & D System Information System 3. At the same time, the Help Desk has access to all information retrieved by the OIK. This is enabled using Web-technology.

The Power System Information System 3, contains information about the power distribution network and equipment, stored in such forms as:

Computer aided design (CAD) documents,
Schematic electrical drawings, other schematics,
scanned paper documents,
scanned drawings
text documents,
multimedia documents or files containing information stored as any one or combination of text, video clips, pictures and sounds. Many of the stored files contain active links, such as embedded HTML, cHTML or XML links to other parts of the same documentation or to other documents containing information associated with a subject matter. This facilitates finding related or more detailed information about a component, network or part thereof.

In general when the utility discovers there is something wrong with a component, such as component 10, an Inspector 5 is sent out to the site where the fault has been located. The inspector, or inspector/repairman, uses the OIK to make an inspection and communicates with the Help Desk. With the help of one or more pictures provided by the OIK, the Help Desk is provided with an opportunity to examine the same indications, symptoms or conditions as the inspector. Both have access to the Power System Information System, according to another aspect of the invention, where detailed information about the component and related parts of the Power T&D network the component is a part of are stored. In this interaction between Inspector and Help Desk, the Help Desk comes up with a solution to the problem, and takes proper action. If the problem can be solved immediately, the Help Desk guides the inspector on site in the repair and/or re-connection or re-booting of the component. If not, the Help Desk identifies spare parts needed, repairs or other actions that must be taken. The Help Desk may be connected directly to the Service Provider Company's Spare Part System Database 12 and Engineering Staff (also by the use of Web-technology), and use these resources to specify a schedule for re-engineering of the component, with a guaranteed response time, included in the warranty, to the utility. Purchases and Work Orders are generated to carry out the planned repair, preferably generated and transmitted using web technology. Depending on the complexity of the situation, the actual planning may take place off-line, but when it is done, the steps to be taken, the work orders, purchase orders and associated warranty etc. are documented in the Information System.

Figure 3:
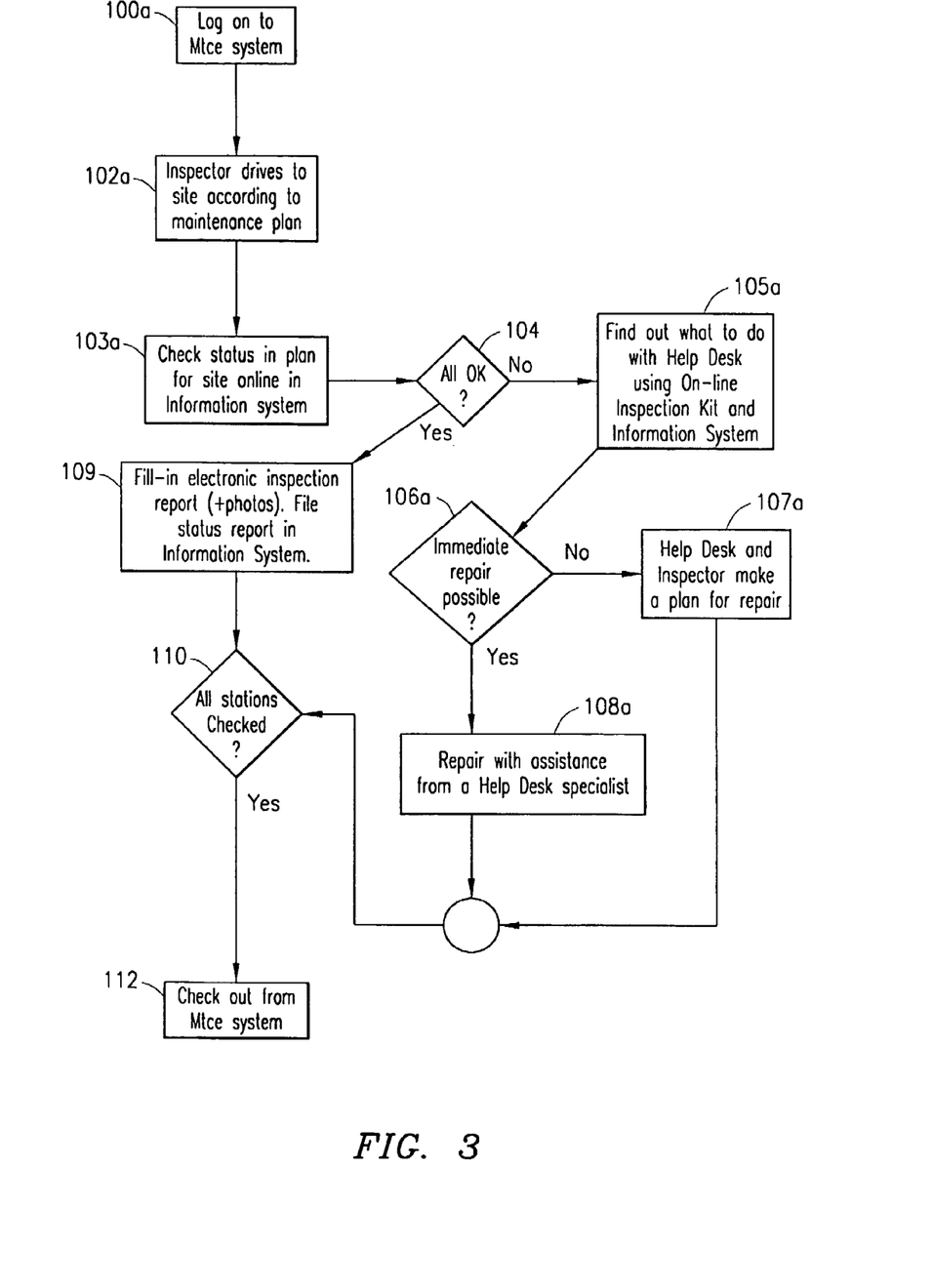
FIG. 3 shows a flowchart for a method to provide planned maintenance according to an embodiment of the invention.

FIG. 3 shows the steps of a method according to an embodiment of the invention. It comprises a log-in step 100a, a visit to a site 102a, a status check on site 103, a status decision step 104. A Yes decision following 104 leads to an electronic inspection report step 109. Decision step 110, all stations checked, may follow step 109, and log-out step 112 may follow a Yes decision to decision step 110.

A No decision following status decision step 104 leads to an inspection step 105 in which the inspection result including picture information is communicated with the Help Desk. This leads to a decision step 106a, is immediate repair possible. A Yes decision to step 106a leads to a repair step 108a, carried out by the Inspector with help from Help Desk. A No decision following decision step 106a results in step 107a in which the Inspector and the Help Desk make a plan for repair. A planned repair logged in the information system will almost always include a guaranty dependent on the terms of the service agreement.

FIG. 3 shows an example for an exemplary example of standard planned maintenance, periodic maintenance. This could be periodic maintenance of a (primary or secondary) distribution substation, including pad mounted transformers, and/or pole mounted transformers (eg in USA). The utility has a maintenance and inspection plan for distribution substations stored in the Power T&D System Information System. This plan may have been developed by Service Provider company 2, or Utility itself 1, it depends on the Utility's level of outsourcing.

Maintenance personnel, such as the inspector 5, either employed by Utility or the Service Provider company, drives out to the distribution substation, and checks status on various substation components according to the plan, step 103 of FIG. 3. For example, the inspector may check for:

oil-leaks from a transformer,
oil-level in a transformer,
are insulators on the transformer dirty?
is the substation in general tidy and clean?
are there any unusual sounds?
are all meters working properly, do they show sensible values?

If no serious error is found, he then fills in a form so as to report the substation status. Traditionally this form would be a piece of paper, that has to be returned to the Utility, and at return the document would have to be checked in, and any minor anomalies reported to a responsible engineer. According to an aspect of the invention the form is electronic and is automatically registered in Information System, at step 109 of FIG. 3. It is also automatically registered that the inspection has taken place when the document is checked in. Included in the documentation may be one or more digital photos of the station and components taken by a web camera in the OIK.

The inspector then travels to the next station he is supposed to visit within the periodic maintenance schedule, or else back to his office or home, if he is finished.

If an Error is Found During a Planned Inspection.

The inspector discovers there is something wrong, for example there may be loud noise from the transformer indicating a possible failure in a winding, or a dead animal is lying on a busbar, causing a risk of a short-circuit. According to an another aspect of the invention, the inspector contacts the Help Desk while he is on-site. He uses the OIK, including a web-camera 6, a mobile video camera with a connection to the Internet 11, optionally together with audio equipment, to show aspects or symptoms of the error to the Help Desk. The Help Desk and the inspector make an assessment of how serious the error is,
should the error immediately be considered serious and steps for serious errors be taken,
should an attempt at a permanent local fix be made,
should an attempt at a temporary local fix be made, If they consider the error to be serious, they may decide to disconnect the transformer to avoid an even more serious error condition to arise. The helpdesk will first find out if any of the customers connected to this transformer are critical before making a disconnection decision. In any case, the Help Desk will make an assessment of the situation, and find a solution which may include a plan for repair or ordering of spare parts.

Another example of a planned maintenance service that may be carried out is known as condition based maintenance. According to agreed specifications, the inspector/repairman makes observations and measurements during an inspection. If the inspector/repairman observes that, for example, water level in a transformer oil is above a certain limit, or according to meter readings etc an accumulated fault current for a feeder is above certain limit, etc, then the inspector repairman includes that in a report. Dependent on the nature of the condition, maintenance is scheduled for the condition observed either for a planned future maintenance visit or for a specific visit to rectify a specific condition.

Figure 4:
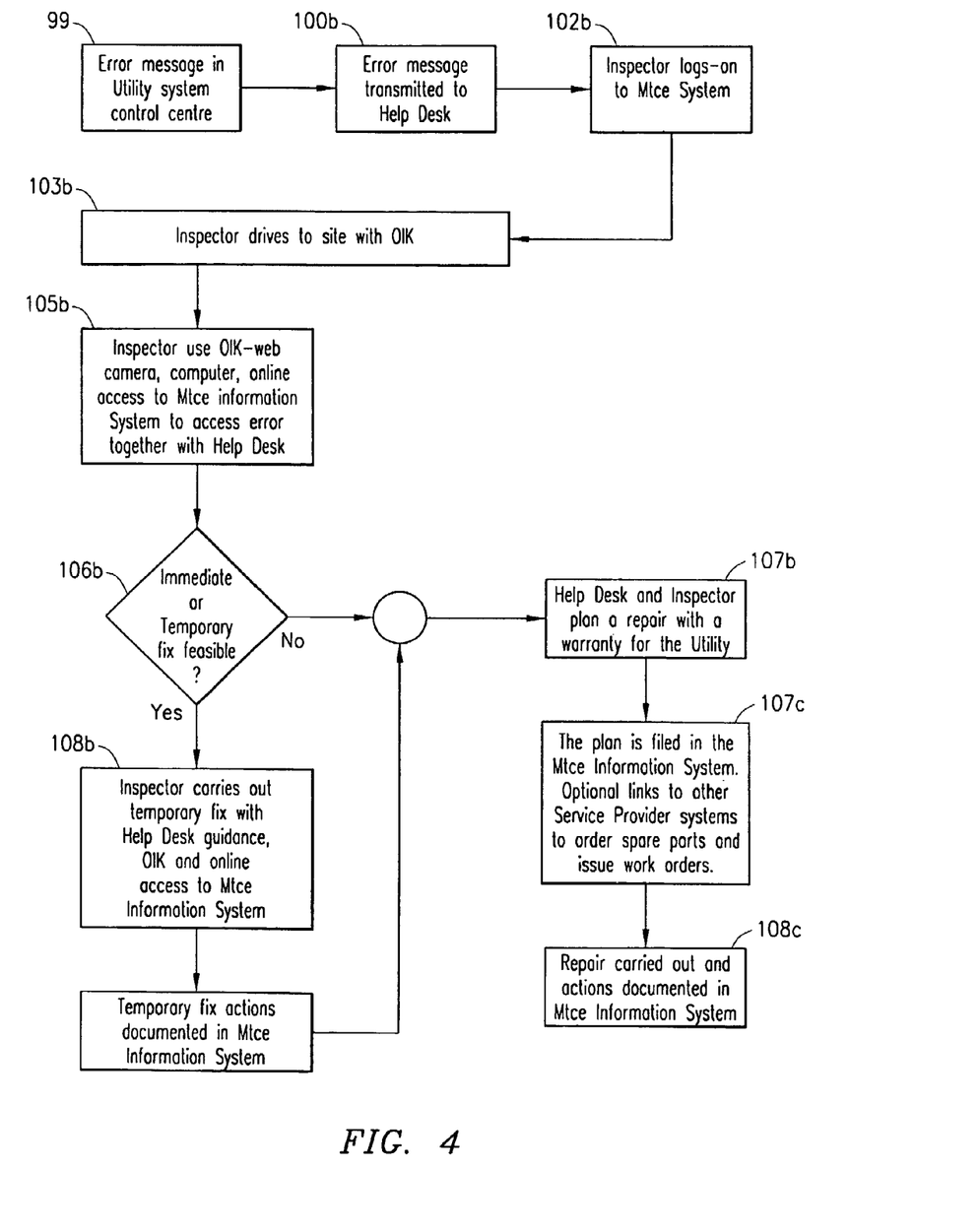
FIG. 4 shows a flowchart for a method to provide maintenance for a reported fault according to a second embodiment of the invention.

FIG. 4 shows an example for an exemplary example of a maintenance schedule for a reported fault.

Example 2

An instrument transformer in a substation has exploded due, for example, to an internal earth fault. As a consequence, a cubicle has been destroyed, and a feeder has lost its current. The system control centre has received a fault indication: feeder n has lost its current.

FIG. 4 shows the steps of an error message received 99 at a utility control centre, transmitting the error 100b to the Help Desk, a log-in in 102b by an inspector, a site visit 103b by inspector, and an inspection 105b with the OIK. A decision step 106b concerning a possible immediate or temporary repair is followed either by a Yes leading to step 108b followed by documentation of the temporary repair in the Power T&D System Information System database or, if No following step 106b, followed by Help Desk and the Inspector making a plan 107b for a repair. A planned repair will normally include a warranty and the plan is documented at step 107c in the Power T&D System Information System. At 108c the repair is subsequently carried out and documented in the Power T&D System Information System, and adequate information is routed to the Customer Information System to keep customers properly informed.

Purchase orders for the spare parts or equipment may be prepared, and sent using web technology purchase orders to a predetermined supplier such as Service Provider company Spare Parts warehouse 12. Work orders for the work may be prepared and sent to a department of the predetermined service provider, normally the Service Provider company, using web technology. At 108b the repair is subsequently carried out and documented in the Power T&D System Information System.

The specification sent to the Service Provider company Spare Parts warehouse 12, or routed alternatively direct to another seller and or manufacturer to obtain a replacement apparatus or part as a result of a manual or automatic action to purchase is preferably in the form of a purchase order. The most preferred type of order is a purchase order as an open standard document, using for example a type of XML file. Preferably the purchase order also conforms to one or more current standards for electronic documents such as EDIFACT or ASC X12 and/or to similar standards eg SWIFT; or other protocols such as Document Object Model (DOM), Microsoft's™ MSXML and a standard called XHTML 1.0 provided by World Wide Web Committee (W3C). The purchase order is in the form of an electronic document that otherwise corresponds to a traditional EDI type 850 electronic purchase order document. As such, the file transmitted containing the purchase order comprises necessary details such as any of:
    identification of document type
    authorization details,
    security details,
    contact details,
    acknowledgement request details,
    cancellation details
    contract references for seller, manufacturer,
    ordered item identification,
    UPC reference,
    delivery details, carrier and options.

The same error message 99 is also sent to the Help Desk in an embodiment of the present invention. An inspector is sent out to the substation with full inspection kit OIK, including a portable or wearable computer, web-camera, audio equipment. The damage is assessed by the inspector and the Help Desk in co-operation using reports collected with the inspection kit and communicated to the Help Desk. In this example they find out that a serious damage has occurred, and repair is needed. By using the on-line documentation they find out
    how/if re-coupling can be made to restore current to the feeder that has been damaged, or
    are there any other temporary measures such as disconnection of one phase that can be made there and then.

In any case, the Help Desk makes a plan for repair, step 107b, with a warranty to the Utility, orders components etc., in step 107c, and stores that plan in the Information System.

Example 3

The same error indication as Example 3 above (loss of current on feeder n). However in this example, the inspector and the Help Desk find that this was due to an error in a secondary measuring device (a transducer), and that the main (power) circuit is intact. The Help Desk finds the documentation about the transducer in the Information System, and examines the documentation online together with the inspector at the site. They may decide to try a repair of the transducer there and then, and the Help Desk guides the inspector in the process with reference to information contained in the transducer documentation in the Power System Information System.

The service agreement (named above in the description of FIG. 2) between the Utility and the Service Provider company comprises a contract for the provision of maintenance by the Service Provider company to the Utility. The service agreement will typically comprise 24 hr. access to:
    the Help Desk
    the Information System
    and may further comprise items such as:
        standard spare parts per type of location/equipment,
        technicians certified to a specified grade,
        computer programs to simulate or model certain error conditions,
        computer programs to simulate or model conditions for electrical loads on certain equipment or parts of a power network. The Service Agreement may include one or more measures and limits for power quality supply and reliability related to identified aspects of maintenance quality. The measures for maintenance quality will include any of the following parameters:
    delivery time for standard maintenance operations,
    availability (uptime) of a network equipment or a service,
    maintaining expected service life standards for equipment,
    maintenance cost reduction.

Planned maintenance work will normally include a guaranty of a type described in the service agreement for a stipulated period of time according to the conditions laid down in the service agreement following the planned repair. For example, standards regarding expected service life or average service life for equipment may be included in the agreement to guide decisions about relative cost of maintenance or a maintenance measure versus expected shortening of equipment life if the maintenance measure is not carried out.

In another embodiment of the invention, the Help Desk is implemented as a mobile unit. For example in certain regions, it may be more practical to implement the Help Desk in a more flexible way than as for example in a permanent building with a fixed number of staff. The Help Desk is then not necessarily associated with a fixed location with permanent set-up, but may for example also be implemented as one or more an engineers on duty with mobile communication means and Internet access. In another embodiment of the invention a substantial part of the Help Desk operations may be carried out by computer software. Thus an Inspector contacting the Help Desk may, depending on the urgency and importance of the inquiry, interact with an automated guide computer program or expert system type of software and gather and/or exchange information without making direct contact with a Help Desk engineer, at least not at first.

In another embodiment of the invention, the Information System comprises one or more computer programs for modeling and/or simulating the power system under various load conditions. Ready-made changeable models of relevant parts of the power system are available, and the Inspector and Help Desk can simulate the power system to check the effect of various actions before actually performing them. Typically, they could check the effect of disconnecting lines,
disconnection (complete or partial) of loads,
reconfiguring the power network by for example disconnecting one switch and connecting another,
operation of an equipment such as a transformer at reduced load
operation of an equipment such as a transformer at increased load, and evaluate aspects such as the consequences for consumers and reduction of life-time (service life or average service life) for components.

In another embodiment of the invention a substation or other location may be equipped with a built-in video camera connected as a web-cam with an Internet connection. This may be used for scheduled periodic checks, and/or in combination with a site visit by an Inspector to provide added graphic information. For specific locations the web-cam may be equipped with a signal processor for handling the visual and/or infra red elements visible spectrum of the camera signal which signal processor:

samples the picture signal produced by the web-cam,
analyses the signal using a trained artificial neural network system,
determines if a change in visual light spectrum light intensity represents predetermined event such as an arc, flashover or explosion,
determines if a change in light intensity in the infra-red or other part of the light spectrum represents unexpected temperature change such as overheating or a fire,
determines if a change in light intensity represents the entry of a person or an animal into the location scanned,
sends a signal to the Help Desk upon detection of any of an arc, flashover, explosion, temperature rise, entry of person, animal, or other predetermined event, which signal is examined and then automatically logged for recording and further analysis purposes. During a maintenance period, an analysis of a fixed camera signal may optionally be selected, for example by the Help Desk, to monitor for:
presence of a person in a prohibited area while maintenance is being carried out.

It is to be understood that any of the methods described may be carried out by one or more computer programs, or computer program products, or by computer software containing a computer program code element or computer code means or software code portions for enabling a computer or a processor to implement one or more of a series of instructions in order to carry out any of the methods described in this description. Such computer program products are correspondingly comprised in an information system and/or a web site according to the invention.

It is also noted that while the above describes exemplifying embodiments of the invention, there are several variations and modifications which may be made to the disclosed solution without departing from the scope of the present invention as defined in the appended claims.

The invention claimed is:

1. A method to provide maintenance to an electrical power generation, transmission and distribution system including a generation facility and/or an electrical power transmission and distribution network system and equipment connected to said system for distributing electrical power, operated by a Utility, the method comprising the steps of:

receiving information from an electrical power generation, transmission and distribution system reporting a condition of equipment connected to the system;
sending an inspector/repairman to inspect the equipment connected to the electrical power generation, transmission and distribution system;
accessing, by the inspector/repairman, a database of information relating to the electrical power generation, transmission and distribution system;
generating at least one graphic image of the equipment utilizing an online inspection kit that includes a camera and an operator computer terminal with a communications link to the database of information relating to the electrical power generation, transmission and distribution system;
generating an electronic report relating to the equipment via the operator computer terminal, the report including the at least one graphic image of said equipment;
transmitting the report from the operator computer terminal via the Internet to the database;
accessing the report at a help desk;
receiving via at least one of the operator computer terminal and the help desk information about said equipment and/or said electrical power generation, transmission and distribution system;
comparing at the help desk said stored information with the report;
generating a maintenance recommendation at the help desk based on the report and the stored information and transmitting the maintenance recommendation from the help desk to the inspector/repairman;
selecting a possible action for a repair or temporary measure;
inputting technical details for modeling and/or simulating individual equipment and/or a part of a power network according to the possible repair or temporary measure;
examining the modeling result and appraising the merits of the possible repair or temporary measure; and modeling an effect of any of, disconnecting lines, disconnection of a complete or partial load, reconfiguring the power network by disconnecting one switch and connecting another, operation of an equipment at reduced load, operation of an equipment at increased load.

2. The method according to claim 1, further comprising making a decision for the inspector/repairman to carry out a repair in consultation with the Help Desk.

3. The method according to claim 1, wherein the inspector/repairman carries out a temporary repair in consultation with the Help Desk.

4. A method according to claim 1, further comprising:
documenting the repair carried out by the inspector/repairman in consultation with the Help Desk; and
storing a report of the repair within the database of the electrical power transmission and distribution network system.

5. The method according to claim 1, further comprising creating, by the inspector/repairman in consultation with the Help Desk, a plan to repair a fault at a later time.

6. The method according to claim 1, further comprising documenting, by the inspector/repairman in consultation with the Help Desk, a plan to repair a fault at a later time in full.

7. The method according to claim 6, wherein the plan to repair the fault at a later time comprises a guaranty.

8. The method according to claim 1, comprising taking action to place purchase and/or procurement orders for spare parts and or new equipment.

9. The method according to claim 1, comprising taking action to place one or more work orders to procure and schedule work according to a plan for repair to an equipment or to a part of the power network.

10. The method according to claim 1, comprising transmitting, via the Internet, information about a condition of an equipment or part of the power network.

11. The method according to claim 1, wherein the Help Desk is implemented as one or more engineers with mobile communications, mobile computers, and mobile access to data communication networks including the Internet.

12. The method according to claim 1, wherein the Help Desk further comprises one or more computer programs of an expert system type configured so as to enable an inspector/repairman to input information concerning an equipment and retrieve further technical information about maintenance of the equipment.

13. The method according to claim 1, further comprising evaluating a possible result of a maintenance action such as:
a consequence for electrical power consumers; and
a reduction of life-time of a component.

14. The method according to claim 1, comprising receiving, from the Utility, a notice of a condition of an equipment or part of the power network.

15. The method according to claim 1, further comprising receiving, from the electrical power transmission and distribution network system, a condition of an equipment or part of the electrical power transmission and distribution network system dependent on an analysis of a signal from the camera at a site or other location of the electrical power transmission and distribution network system.

16. A system for providing maintenance to an electrical power generation, transmission and distribution system including a generation facility and/or an electrical power transmission and distribution network system and equipment connected to said system for distributing electrical power, the electrical power system operated by a first party utility and maintenance instructions provided by a second party helpdesk, the system comprising:
an electrical power generation, transmission and distribution system including equipment connected to said system for distributing electrical power;
a central computer having a storage and a network connection, said storage having stored thereon a database of information relating to the electrical power generation, transmission and distribution system;
a utility computer receiving information from the electrical power generation, transmission and distribution system relating to a condition of equipment connected to the electrical power generation, transmission and distribution system;
an online inspection kit including a camera and an operator computer terminal having a network connection operated by an inspector/repairman for the first party utility;
the online inspection kit, operated by said inspector/repairman, generating at least one graphic image of the equipment with the camera and generating a report relating to the equipment, wherein the report and at least one graphic image are transmitted to the database;
a helpdesk computer operated by the second party helpdesk having a network connection and coupled to the database;
said report and information about the electrical power system received by said helpdesk computer from said database;
a maintenance recommendation generated on the second party helpdesk based on the report and the information about the electrical power generation, transmission and distribution system;
wherein said maintenance recommendation is transmitted from the second party helpdesk to the inspector/repairman for the first party utility;
further comprising one or more computer programs for:
inputting technical details for modeling and/or simulating individual equipment and/or a part of a power network according to a selected possible repair or temporary measure;
examining the modeling result and appraising the merits of the possible repair or temporary measure; and
modeling an effect of any of, disconnecting lines, disconnection of a complete or partial load, reconfiguring the power network by disconnecting one switch and connecting another, operation of an equipment at reduced load, operation of an equipment at increased load.

17. The system according to claim 16, wherein the camera of the online inspection kit is a web camera and is operable to send pictures in a format comprising TCP/IP.

18. The system according to claim 16, further comprising a communication connection enabling two-way voice communication between the inspector/repairman for the first party utility and the second party helpdesk.

19. The system according to claim 16, wherein the database is updated according to work performed on the equipment.

20. The system according to claim 16, further comprising a service report including details of a plan to provide maintenance service at a later time.

* * * * *